Patented Mar. 13, 1951

2,544,692

UNITED STATES PATENT OFFICE 2,544,692

PRESSURE-SENSITIVE ADHESIVE TAPE

Joseph H. Kugler, St. Paul, and William E. Lundquist, Savage, Minn., assignors to Minnesota Mining & Manufacturing Company, St. Paul, Minn., a corporation of Delaware No Drawing. Application April 20, 1949,
Serial No. 88,688

4 Claims. (Cl. 117—122)

This invention relates to eucohesive normally tacky and pressure-sensitive adhesive tapes and methods of making. In particular the invention relates to adhesive tapes having a coating of a normally tacky and pressure-sensitive adhesive comprising the copolymer of an acrylate ester and a minor amount of a fumarate di-ester.

Polymers of acrylate esters have heretofore been employed as adhesives in various ways, and such polymers, as well as copolymers of acrylate esters with other copolymerizable monomers, have been used as coatings for various purposes. Prior to the present invention, however, to the best of our knowledge copolymers of acrylates and fumarates have never been shown to have pressure-sensitive adhesive qualities and have never been employed as adhesives for normally tacky and pressure-sensitive adhesive tapes.

The acrylate esters of the type which form pressure-sensitive polymers are difficult to polymerize uniformly, particularly in commercial-scale operations. During polymerization the exothermic reaction provides a considerable heat rise which is difficult to control on a large scale. When polymerization is attempted at a lower initial temperature, the induction period at such temperature is found to be so long as to make the preparation impractical. With different batches the induction period varies considerably. The resulting polymers may be variable in composition and properties.

Another disadvantage of the acrylate polymers heretofore suggested as having pressure-sensitive adhesive properties is the high cost of the monomeric material. Compounding of the acrylates to provide less expensive adhesives, as by the addition of other resins, diluents, plasticizers or the like has not been found to provide compositions having suitable properties.

It is therefore an object of the present invention to provide coated adhesive sheet material carrying a less expensive type of acrylate pressure-sensitive adhesive. Another object of the invention is the provision of adhesive tapes coated with acrylate adhesives of an improved degree of uniformity and of controlled molecular structure. A further object is the provision of adhesive tapes having particular properties for specific uses. Other objects and advantages will be made apparent as the description of the invention proceeds.

We have now found that normally tacky and pressure-sensitive adhesive masses having particularly desirable properties for use as the adhesive coating of pressure-sensitive adhesive tape and sheet material may be produced by copolymerizing 75–95 parts of an acrylate ester of a saturated nontertiary monohydric alcohol having 4–6 carbon atoms with correspondingly 25–5 parts of a fumarate di-ester of a saturated non-tertiary monohydric alcohol having 4–6 carbon atoms. One example of a preferred copolymer according to this invention and having preferred proportions of monomers is a copolymer of isobutyl acrylate with 5–10% of 2-ethyl butyl fumarate. Other examples will appear hereinbelow. The copolymers may be further modified where desired, e. g. to provide increased firmness, by the inclusion of small amounts of cross-linking agents, or by the incorporation of reinforcing pigments, or in other ways.

While any non-tertiary alcohol ester of acrylic acid is advantageously copolymerized with the fumarates as above indicated, it is found that acrylates whose polymers are somewhat lacking in rubberiness or elasticity, such as the acrylate esters of branched chain alcohols, offer the greatest possibility for improvement. In particular, such copolymers exhibit improved properties when tested at low temperatures as compared with the corresponding unmodified branched-chain acrylate polymers, and the coated tapes are smoother and less jerky in their unwinding and removal properties even at normal room temperature.

The neutral di-esters of fumaric acid may be prepared by heating maleic or fumaric acid with the desired alcohol or mixture of alcohols in the presence of a catalyst such as para-toluenesulfonic acid under reflux, and finally removing water and excess alcohol by distillation, according to well known methods. When maleic acid (or preferably maleic anhydride) is employed, a maleate is first formed; but long continued heating under acid conditions (or brief heating in the presence of about 1% of piperidine or the like) converts the maleate to the fumarate. It is desirable that all of the maleate be converted to the fumarate prior to polymerization since this conversion is itself exothermic and would otherwise provide for an additional increase in temperature of the polymerization mass.

While polymerization may be accomplished in organic solution or even in bulk, we prefer to carry out the polymerization in an aqueous medium, according to methods well known in the art. The polymer is then ordinarily coagulated, removed from the aqueous medium and dissolved in suitable organic solvents for application as an adhesive coating. Alternatively, the polymer may be coated directly from aqueous dispersion, or by calender coating in the dry state, or in any other convenient manner.

In forming the copolymer of this invention by emulsion polymerization we prefer first to dissolve 0.25 to 1% of emulsifier and .02 to 1% catalyst in water which has been buffered to a pH of about 4–9. The monomers are then added with stirring to form the emulsion, and the mass is moderately heated until reaction has commenced. While cooling is ordinarily required at this point in commercial polymerizations of acrylate monomers alone, we have found that the amount of heat given off by copolymerization of our monomer mixtures is such as to require no cooling. On the other hand, where the acrylates alone do not polymerize satisfactorily at lower temperatures at which the excessive heating could more readily be controlled, we have found that our mixtures of monomers require only a short induction period at such temperatures and that they then proceed to polymerize rapidly with the formation of desirably high molecular weight copolymer products. In addition we have found that extremely high purity of the monomeric materials, such as has been found necessary with the acrylates alone, is not essential to successful polymerization of our mixture of acrylate and fumarate esters.

Following are specific examples of exemplary methods of making our improved polymers, of the raw materials and proportions employed therein, and of the improved adhesive and coated tape products obtained. In these examples all parts are given as parts by weight unless otherwise specified.

EXAMPLE 1

*Formula*

|  | Parts |
|---|---|
| Water | 800 |
| Commercial lauryl sulfate-sodium salt ("Duponol ME") | 4 |
| Ammonium persulfate | 1 |
| Sodium bicarbonate—to pH of 4–9 | about 1 |
| Isoamyl acrylate | 190 |
| Di-n-butyl fumarate | 10 |

*Directions*

Dissolve the sodium bicarbonate, catalyst and emulsifier in the water in a closed kettle under an oxygen-free atmosphere. Add the acrylate and fumarate monomers with moderate stirring sufficient to provide a good emulsion. Heat the charge to 60° C. and hold at that temperature. After an induction period of 7 minutes the exothermic polymerization reaction starts and the temperature of the charge rapidly increases to 79° C. Allow the charge to cool to 75° C., hold 20 to 30 minutes at that temperature to ensure completion of the reaction, and then coagulate the polymer by adding a sufficient quantity of a 4% solution of barium chloride. Remove and rinse the coagulated polymer and dry by milling it on a rubber mill. Dissolve the polymer in a mixture of 95 parts heptane and 5 parts alcohol to a solids concentration of 20%. The solution is now ready for coating on a suitable backing such as cellophane, treated paper, cellulose acetate or the like in the production of coated normally tacky and pressure-sensitive adhesive tape or sheet material. A coating weight of 36–42 grains per sq. ft. after evaporation of the volatile solvent is found to be suitable where cellophane is employed as the backing. The resulting tape in this instance is transparent.

In the above example the polymer is found to be readily soluble in the mixture of heptane and alcohol. Where a specific polymer is less readily soluble or incompletely soluble, other solvents may be employed, or small amounts of more active solvents may be added to hydrocarbon solvents or to the heptane-alcohol mixture of the example. One such addition which has been found useful consists of 5–10% of methyl ethyl ketone.

EXAMPLE 2

In this example the same raw materials were used but in a somewhat different proportion; namely, 80 parts of isoamyl acrylate to 20 parts of di-n-butyl fumarate. The induction period at 60° C. was reduced to 3 minutes and the exothermic reaction carried the temperature of the batch only to 75° C.

Where isoamyl acrylate was polymerized alone, the induction period at 60° C. was 25 minutes or more and the temperature of the batch rose to 81° C. or higher. These figures varied considerably with monomers of different degrees of purity, with the introduction of small amounts of oxygen, and with other variables; and hence the polymerization was difficult to control so as to obtain a uniform product from batch to batch. Furthermore it was impossible to obtain polymerization at low induction temperatures, e. g. of the order of 40–50° C. within any reasonable length of time. These difficulties were avoided, and an improved product was obtained, by employing the mixtures of monomers as hereinabove described.

EXAMPLE 3

This example represents an intermediate composition between that of Examples 1 and 2. Ninety parts isoamyl acrylate and 10 parts di-n-butyl fumarate were copolymerized to form an adhesive mass and a coated pressure-sensitive adhesive tape having substantially identical adhesion value and an intermediate internal strength as compared with the other two examples.

EXAMPLE 4

Ninety parts of a mixture of 75 parts 2-ethyl butyl acrylate and 25 parts ethyl acrylate were copolymerized with 10 parts of di-2-ethyl butyl fumarate to provide an adhesive polymer at a cost substantially less than that of an unmodified acrylate polymer. Successive batches of this copolymer were produced without significant variation in properties, illustrating the better control of polymerization which is attainable with our copolymers.

EXAMPLE 5

A copolymer of 90 parts 2-ethyl butyl acrylate and 10 parts di-2-ethyl butyl fumarate had a somewhat lower adhesion value and was somewhat softer than the copolymer of Example 4.

EXAMPLE 6

Another copolymer having substantially the same adhesion value as that of Example 4 but improved firmness over the polymer of Example 5 was prepared from 60 parts 2-ethyl butyl acrylate, 30 parts isobutyl acrylate, and 10 parts di-2-ethyl butyl fumarate.

EXAMPLE 7

A copolymer of 90 parts isobutyl acrylate and 10 parts di-2-ethyl butyl fumarate was found to have an adhesion value higher than that of the previously described polymers and also an extremely high internal strength. In the form of an adhesive coating on a tape backing the polymer was found to be less "snappy" or jerky than a polymer of isobutyl acrylate alone, when the tape was stripped from surfaces to which adhesively applied.

EXAMPLE 8

Another high adhesion value copolymer having high internal strength was prepared from 60 parts isobutyl acrylate, 30 parts 2-ethyl butyl acrylate and 10 parts di-2-ethyl butyl fumarate.

EXAMPLE 9

A slight reduction in adhesion value and in internal strength was obtained in the polymer of Example 8 when the proportions were changed to 45 parts isobutyl acrylate, 45 parts 2-ethyl butyl acrylate and 10 parts di-2-ethyl butyl fumarate.

EXAMPLE 10

Substitution of di"Cellosolve" fumarate for the di-2-ethylbutyl fumarate of Example 4 was found to increase the adhesion value and the internal strength of the resulting copolymer adhesive. Di"Cellosolve" fumarate is the ester of one mole of fumaric acid and 2 mols of ethylene glycol monoethyl ether.

The normally tacky and pressure-sensitive adhesive masses of the above examples and of this invention are eucohesive; that is, they are more cohesive than adhesive, but still tacky. Hence the coated adhesive tape product can be unwound from roll form, handled with the fingers, and stripped from smooth surfaces, without leaving an adhesive residue or gumming the fingers.

In preparing the adhesive tape or coated adhesive sheet materials of this invention we may use any of the commonly employed flexible backings and any of the adhesive priming coatings, backsizings, and the like, as will be appreciated by those skilled in the adhesive tape art. Likewise we may add pigments and other modifiers to our adhesive compositions where opacity, color, increased firmness, or other effects are desired. As hereinbefore indicated, we may improve the firmness of our adhesive polymer by incorporating small percentages of cross-linking agents with the original monomers; such cross-linking agents include difunctional molecules such as diamyl ethylene difumarate, diallyl succinate, diamyl ethylene dimaleate and the like.

The alcohols from which our acrylate and fumarate monomers are produced are, as shown by the examples and as previously indicated elsewhere, saturated non-tertiary monohydric alcohols having from 4 to 6 carbon atoms. As will be evident on consideration of the monomers employed in Examples 4 and 10 as well as certain other examples, the number of carbon atoms required in the alcohol is in reality an average value. Thus in Example 4, three parts of 2-ethyl butyl acrylate and 1 part of ethyl acrylate provide properties which are equivalent to those of an acrylate of a similar alcohol having five carbon atoms; and this number represents a preferred species. The di"Cellosolve" fumarate of Example 10 contains only 4 carbon atoms but contains also an intermediate oxygen atom, and this structure has been found to be substantially equivalent to that of a normal 5 carbon chain.

It has previously been stated that acrylates of branched chain alcohols form particularly useful copolymers with our fumarate di-esters. Fumarates of branched chain alcohols may also be used, as is apparent from the examples. It is found, however, that fumarates of secondary alcohols provide less desirable adhesive copolymers than do the fumarates of primary alcohols, and this latter class of esters is therefore preferred by us.

We have thus produced novel polymers and novel adhesive materials having improved properties and at a reduced cost. The required characteristics of the coated adhesive tapes made therewith, such as adhesion value, internal strength of adhesive, softness or "brittleness" (i. e. jerkiness of tape removal), and the like are seen to be susceptible of accurate control in accordance with the disclosures of this invention. Since substantially identical properties may be obtained with different acrylate esters by copolymerization with varying proportions of various fumarate esters, it is apparent that the securing of desired properties in the finished tape is made less dependent than heretofore on the availability of specific acrylates.

Modifications and/or variations of the several aspects of the present invention which likewise distinguish over the prior art are contemplated.

This application is a continuation-in-part of our copending application, Serial No. 515,462, filed on December 23, 1943.

What we claim is as follows:

1. Permanently tacky and pressure-sensitive adhesive tape including a backing and a pressure-sensitive adhesive coating on at least one surface thereof, said coating comprising a copolymer of 100 parts of isobutyl acrylate and 5–10 parts of 2-ethyl butyl fumarate.

2. An adhesive tape including a backing sheet and a coating on at least one surface thereof of a eucohesive normally tacky and pressure-sensitive adhesive comprising a copolymer of 90–95 parts of an acrylate ester of a saturated primary monohydric branched chain alcohol having 4–6 carbon atoms and correspondingly 10–5 parts of a fumarate di-ester of a saturated primary monohydric alcohol having 4–6 carbon atoms.

3. An adhesive tape including a backing sheet and a coating on at least one surface thereof of a eucohesive, normally tacky and pressure-sensitive adhesive comprising a copolymer of 90–95 parts of an acrylate ester of a saturated non-tertiary monohydric branched chain alcohol having 4–6 carbon atoms and correspondingly 10–5 parts of a fumarate di-ester of a saturated non-tertiary monohydric alcohol having 4–6 carbon atoms.

4. An adhesive tape including a backing sheet and a coating on at least one surface thereof of a eucohesive, normally tacky and pressure-sensitive adhesive comprising a copolymer of 90–95 parts of an acrylate ester of a saturated non-tertiary monohydric alcohol having 4–6 carbon atoms and correspondingly 10–5 parts of a fumarate di-ester of a saturated non-tertiary monohydric alcohol having 4–6 carbon atoms.

JOSEPH H. KUGLER.
WILLIAM E. LUNDQUIST.

REFERENCES CITED

The following references are of record in the file of this patent:

UNITED STATES PATENTS

| Number | Name | Date |
|---|---|---|
| 2,137,636 | Barrett | Nov. 22, 1938 |
| 2,356,879 | Pense et al. | Aug. 29, 1944 |
| 2,426,325 | Tawney | Aug. 26, 1947 |